July 17, 1962 S. WARNER 3,045,103
COMMUTATOR FUSING MACHINE
Filed Oct. 10, 1960 3 Sheets-Sheet 1
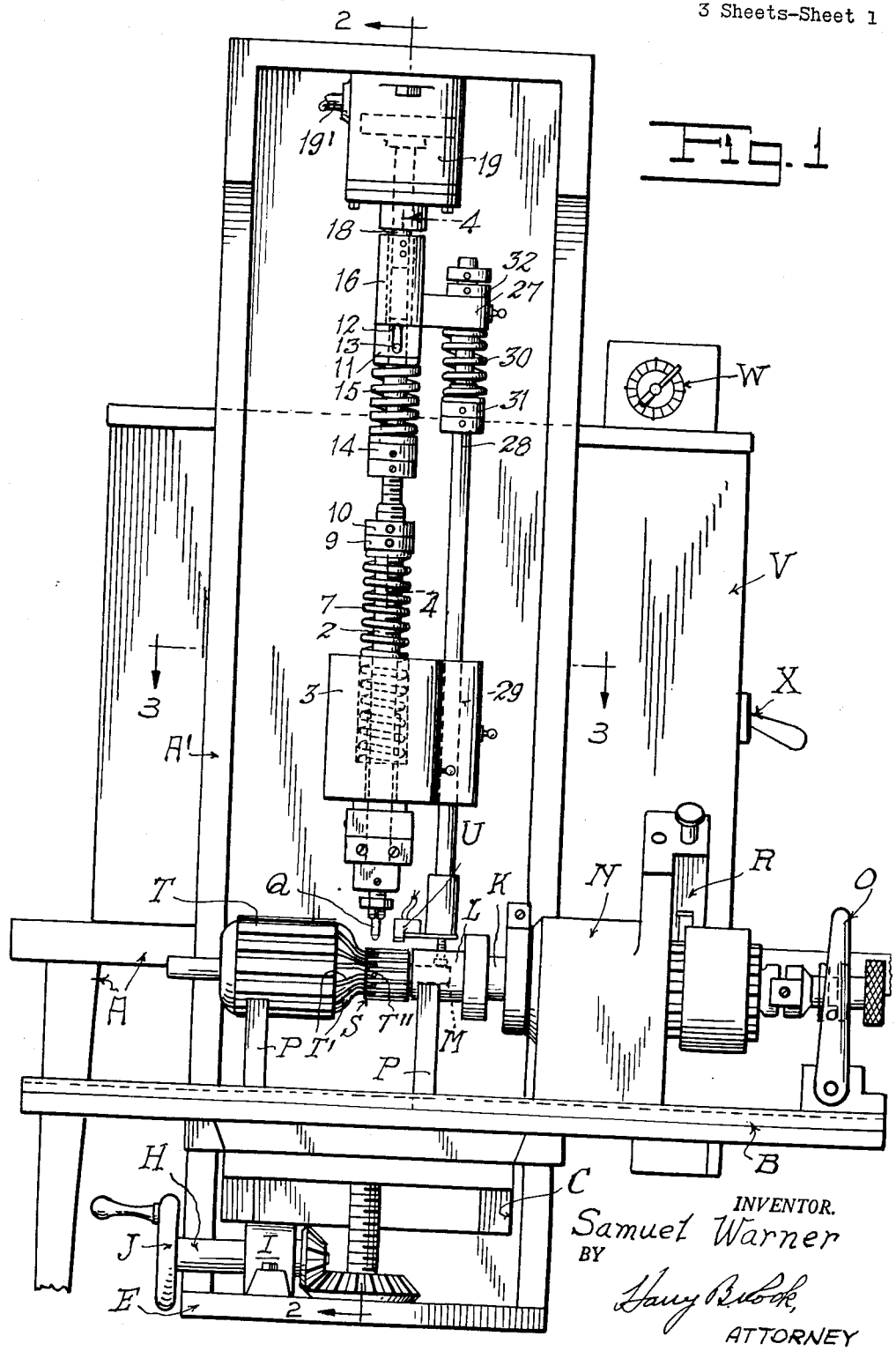
INVENTOR.
Samuel Warner
BY
Harry B. Cook,
ATTORNEY

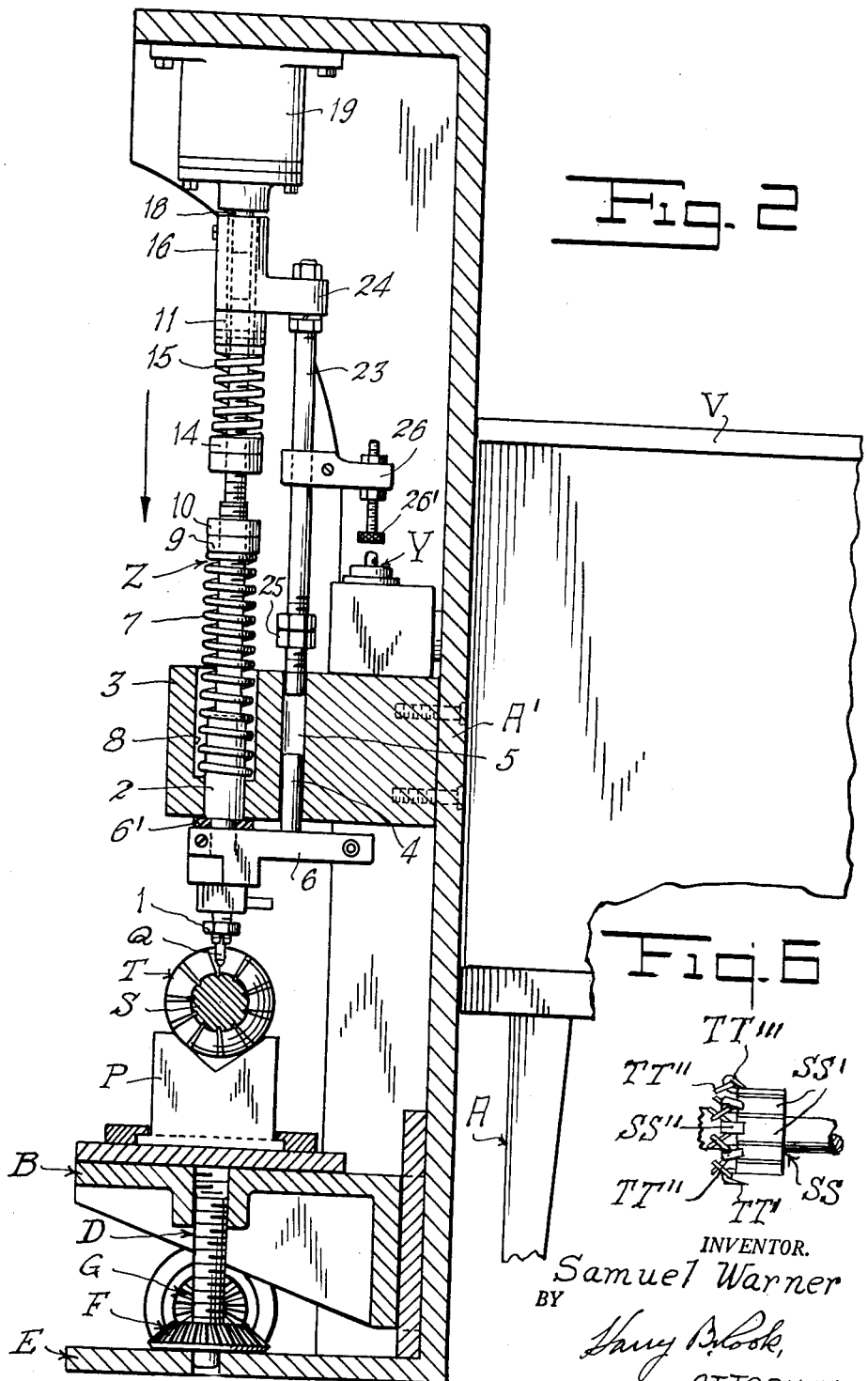

July 17, 1962
S. WARNER
3,045,103
COMMUTATOR FUSING MACHINE
Filed Oct. 10, 1960
3 Sheets-Sheet 3
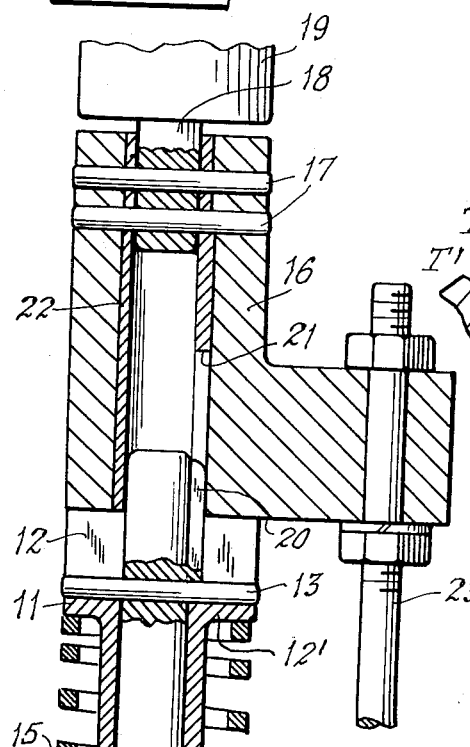
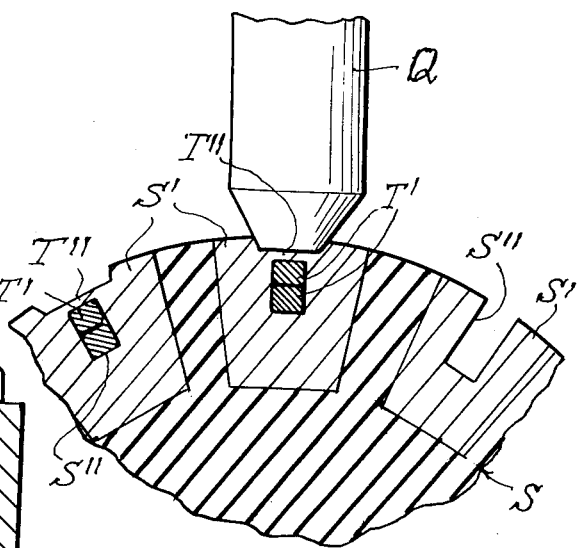
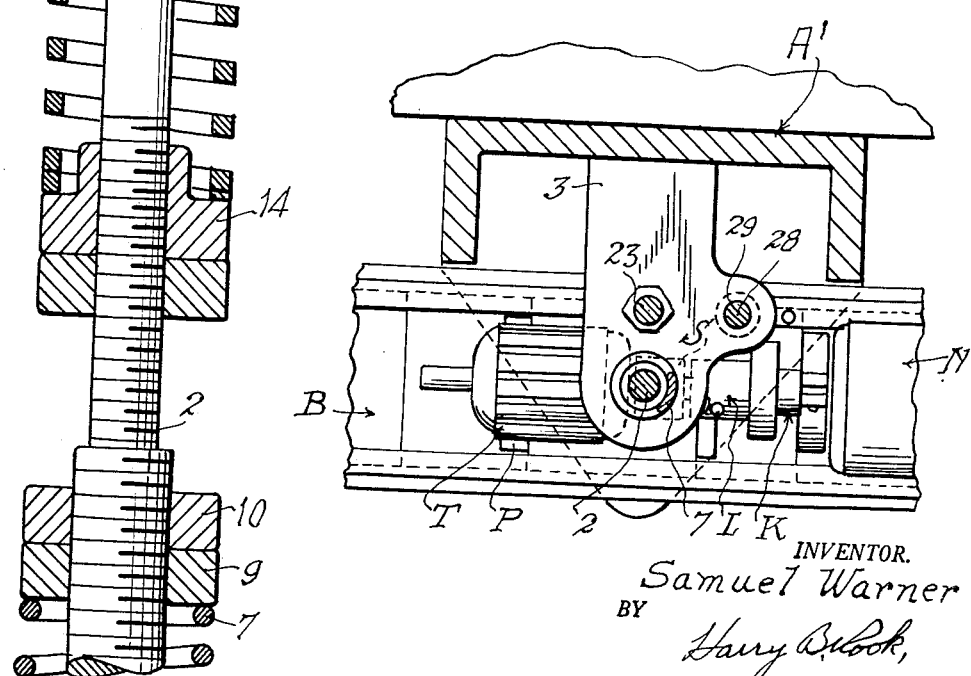
INVENTOR.
Samuel Warner
BY
Harry B. Cook,
ATTORNEY United States Patent Office 3,045,103
Patented July 17, 1962

3,045,103
COMMUTATOR FUSING MACHINE
Samuel Warner, 1439 Highland Ave., Hillside, N.J.
Filed Oct. 10, 1960, Ser. No. 61,542
4 Claims. (Cl. 219—78)

This invention relates in general to apparatus for fusing or spot welding electric motor armature wires to the corresponding commutator bars. Apparatus of this character in general includes two electrodes that constitute the terminals of a welding circuit, and means for actuating the electrodes into and out of contact with the parts to be welded or fused, such as the bars of a commutator and the wires of an armature, the actual fusing or welding taking place at the point of contact of one of the electrodes with the parts to be welded such as the commutator bars.

A primary object of the present invention is to provide a novel and improved construction and combination of parts whereby a controlled and yielding contact of the fusing electrode with the work shall be insured so as to prevent excessive fusing of the work and excessive pressure of the electrode against the work.

Another object is to provide apparatus of this character wherein means for actuating the electrode shall comprise a motor such as a fluid pressure motor, a reciprocating main shaft or electrode holding and operating rod actuated to move the electrode into contact with the work by said motor and actuated in the opposite direction by a spring, said rod comprising a plurality of relatively longitudinally yieldingly movable sections, one of which carries the electrode and the other of which is connected to the motor.

Other objects, advantages and results of the invention will be brought out by the following description in conjunction with the accompanying drawings in which:

FIGURE 1 is a front elevation of the apparatus embodying the invention;

FIGURE 2 is a transverse vertical sectional view approximately on the plane of the line 2—2 of FIGURE 1;

FIGURE 3 is a horizontal sectional view approximately on the plane of the line 3—3 of FIGURE 1;

FIGURE 4 is a greatly enlarged central vertical sectional view approximately on the plane of the line 4—4 of FIGURE 1;

FIGURE 5 is a greatly enlarged fragmentary transverse vertical sectional view through a portion of the armature showing the manner of fusing wires in slots in the commutator bars; and FIGURE 6 is an enlarged fragmentary schematic elevation of another form of commutator to whose bars the armature wires may be fused with the machine of the invention.

Specifically describing the illustrated embodiment of the invention, the apparatus includes a main frame A having a bed B vertically slidably movable thereon in guideways C and elevated and lowered by suitable mechanism such as a screw D having one end threaded in the bed and the other end rotatable in a bracket E of the frame and on which is fixedly mounted a bevel pinion F which meshes with another bevel pinion G carried by a stub shaft H journaled in a bearing I in the bracket E and having connected thereto a handwheel J.

Mounted on the top of the bed B is an armature holding and indexing mechanism of generally known construction that includes a shaft K on which is mounted a clutch L having a socket in which is releasably clamped one end of the armature-commutator shaft as indicated at M, the shaft being journaled in a bearing N on the bed and the clutch mechanism being manually operated by a lever O that is pivoted on the bed. The bed also has mounted thereon a pair of rests P for supporting the armature in horizontal position so that it can be rotated for indexing the commutator bars beneath the electrode Q by a suitable known pawl and ratchet mechanism R which rotates the shaft K step by step.

With this mechanism, it will be understood that the commutator S and its armature T will be rotated step by step or indexed to bring the commutator bars S' successively beneath the electrode Q so that the commutator wires T' can be fused or welded in slots S" in the commutator bars as best shown in FIGURE 5, at T".

In addition to the electrode Q, the fusing or welding apparatus includes a second electrode U which contacts the commutator bar simultaneously with the electrode Q, and the welding circuit may be controlled by any suitable means including a transformer, relays and other necessary switches enclosed in a suitable housing V, and a timing mechanism W. The circuit includes a main control switch X and a normally open micro-switch Y which is closed by the operating mechanism for the electrode Q when the electrode contacts the commutator bar or other work.

In accordance with the invention, the electrode Q is removably secured in a suitable clutch 1 on the end of one section 2 of a main electrode operating shaft or rod Z that is vertically reciprocably mounted in a bearing bracket 3 projecting from a vertical portion A' of the main frame. The rod Z is held against rotation by a pin 4 that is loosely reciprocable in an opening 5 in the bracket 3 and is rigidly connected to a lateral arm 6 that is secured and projects from the rod section 2.

The rod Z is normally influenced upwardly to raise the electrode out of contact with the work by a compression spring 7 one end of which abuts the bottom of a socket 8 in the bracket 3 while the other end abuts an adjustable nut 9 on the rod section which is held in adjusted position by a lock nut 10, such upward movement being limited by abutment of the arm 6 with the bearing 3, through a cushion washer 6'.

The upper end of the rod section 2 has relatively longitudinally movably but non-rotatably mounted thereon a pressure spring adapter 11 which has a vertical diametral slot therein into which extends the ends of a pin 13 rigidly secured and extending diametrally of the rod section 2. The adapter 11 has a shoulder 12' between which and an adjustable nut 14 on the rod section 2, is interposed a compression spring 15. A sure block 16 has its lower end in abutting contact with the adapter 11 and its other end rigidly connected as by pins 17 to the driving element or piston rod 18 of a fluid pressure motor that includes a cylinder 19 in which the piston 18' of the piston rod 18 is reciprocable. A relative rotation of the pressure block and the rod section 2 is prevented by a key fin 20 on the rod section that is slidable in a key slot 21 in a tube 22 that is rigidly secured in the pressure block. Fluid under pressure is supplied to the cylinder 19 from any suitable source through a pipe 19' and released or vented from the cylinder, under control of a solenoid actuated valve the solenoid of which is connected in the circuit in a known manner.

With this construction, it will be understood that when the circuit is closed by the main switch X, the timer W is started in operation and the solenoid valve admits air to the cylinder 19 so as to start the piston downwardly and push the main shaft or electrode rod Z downwardly against the influence of the spring 7 until the electrode Q contacts the work. The movement of the piston then continues so that the pressure block 16 pushes the adapter 11 downwardly against the influence of the spring 15 which continues to exert yielding pressure on the rod section 2 through the nut 14. This insures a yielding welding contact of the electrode Q with the work. The downward movement of the electrode while in contact with the work is positively limited by a stop means which is shown as including a stop rod 23 rigidly secured in a lateral arm 24 on the pressure block 16 and which carries an adjustable stop nut 25 that contacts with the top of the bracket 3 so as to positively stop downward movement of the pressure block and the electrode rod Z.

During contact of the electrode Q with the work, the fusing or welding circuit is closed by actuation of the micro-switch Y by an actuating screw or finger 26′ which is adjustably mounted in an arm 26 that is secured on the stop rod 23. This starts the fusing or welding operation at the electrode Q which is stopped after a predetermined time by actuation of a switch under the control of the timer W.

It will be understood that this construction makes it possible to pre-set the apparatus so that the electrode Q will engage the work with a predetermined or certain yielding pressure, and that the pressure will be gradually applied and increased under the compression of the spring 15 by the motor and pressure block 16 after contact of the electrode with the work.

Any suitable means may be utilized for actuating the grounding electrode U, but as shown the pressure block 16 has a second lateral arm 27, and an actuating rod 28 is slidably mounted in an opening in said arm and in an opening 29 in the bearing bracket 3. The contact of the electrode U with the commutator is also yielding, such a contact being provided by a compression spring 30 interposed between the arm 27 and an adjustable nut 31 on the actuating rod 28, movement of the actuating rod relatively to the arm under the influence of the spring 30 being limited by an adjustable nut 32 on the rod which abuts the side of the arm 27 opposite the spring 30.

It will be understood by those skilled in the art that the machine embodying the invention may be used for fusing other articles and particularly other types of commutators. FIGURE 6 illustrates a so-called "tang" type of commutator bar, the commutator SS including the bars SS′ each of which has a "tang" or ear SS″ which initially is bent with one end in spaced relation to the commutator bar as indicated at TT′ and with one or more of the commutator wires TT‴ looped around the "tang." After the commutator wires TT″ have been connected to the respective ears or "tangs" as shown, the "tangs" are bent and fused as indicated at TT‴. Obviously the fusing operation can be carried out on the machine in the same manner as hereinbefore described with the electrode Q pressed against the "tang" that is being fused.

While I have shown and described the now preferred embodiment of the invention, it should be understood that this is primarily for the purpose of illustrating the principles of the invention and that many modifications and changes can be made in the construction of the apparatus within the spirit and scope of the invention.

I claim:

1. In a fusing or welding apparatus, the combination with a frame, a fusing electrode and a grounding electrode, and a work support, of means mounting said electrodes on said frame and for actuating them toward and from work in said work support, said means comprising an electrode supporting rod having means for mounting the fusing electrode thereon, a support bearing mounting said rod on said frame for reciprocation toward and from work in said work support, a motor mounted on said frame and having a reciprocable driving element in alignment with said rod, means providing for movement of said grounding electrode by said driving element into contact with the work upon movement of said driving element in one direction, a connection between said driving element and said rod providing for movement of said rod by and with said element in one direction to press said electrode into contact with the work and for maintaining yielding pressure of the electrode on the work upon further movement of said driving element in said direction, means for positively limiting movement of said driving element in said direction, and spring means for actuating said rod and fusing electrode in the opposite direction away from the work, said connection including at least one part movable with said driving element and slidable axially relatively to said rod, and a compression spring interposed between said part and said rod, and said means for positively limiting movement of said driving element including a stop rod connected to said part and having means to abuttingly engage a portion of said frame.

2. In a fusing or welding apparatus as defined in claim 1, the addition of a normally open switch for controlling a circuit through said electrodes mounted on said frame, and an element mounted on and movable with said stop rod to actuate said switch into closed position upon movement of said fusing electrode into contact with the work.

3. In a fusing or welding apparatus, the combination with a frame, a fusing electrode and a grounding electrode, and a work support, of means mounting said electrodes on said frame and for actuating them toward and from work in said work support, said means comprising an electrode supporting rod having means for mounting the fusing electrode thereon, a support bearing mounting said rod on said frame for reciprocation toward and from work in said work support, a motor mounted on said frame and having a reciprocable driving element in alignment with said rod, means providing for movement of said grounding electrode by said driving element into contact with the work upon movement of said driving element in one direction, a connection between said driving element and said rod providing for movement of said rod by and with said element in one direction to press said electrode into contact with the work and for maintaining yielding pressure of the electrode on the work upon further movement of said driving element in said direction, means for positively limiting movement of said driving element in said direction, and spring means for actuating said rod and fusing electrode in the opposite direction away from the work, said connection including a pressure block rigidly connected to said driving element and slidable axially relatively to said rod, a compression spring adapter abutting said pressure block and slidable axially relatively to said rod, a nut on said rod, and a compression spring interposed between said adapter and said nut.

4. In a fusing or welding apparatus, the combination with a frame, a fusing electrode and a grounding electrode, and a work support, of means mounting said electrodes on said frame and for actuating them toward and from work in said work support, said means comprising an electrode supporting rod having means for mounting the fusing electrode thereon, a support bearing mounting said rod on said frame for reciprocation toward and from work in said work support, a motor mounted on said frame and having a reciprocable driving element in alignment with said rod, means providing for movement of said grounding electrode by said driving element into contact with the work upon movement of said driving element in one direction, a connection between said driving element and said rod providing for movement of said rod by and with said element in one direction to press said electrode into contact with the work and for maintaining yielding pressure of the electrode on the work upon further movement of said driving element in said direction, means for posively limiting movement of said driving element in said direction, and spring means for actuating said rod and fusing electrode in the opposite direction away from the work, said connection including at least one part movable with said driving element and slidable axially relatively to said rod, and a compression spring interposed between said part and said rod, said means providing for movement of said grounding electrode including a rod relatively slidably connected to said part and having said grounding electrode mounted thereon, and a spring interposed between said part and said rod to provide yielding contact of the grounding electrode with the work.

References Cited in the file of this patent

UNITED STATES PATENTS

| | | |
|---|---|---|
| 1,174,446 | Rietzel | Mar. 7, 1916 |
| 1,610,616 | Schlaf | Dec. 14, 1926 |
| 1,970,941 | Paugh | Aug. 21, 1934 |